United States Patent
Meggiolan

(10) Patent No.: US 10,689,058 B2
(45) Date of Patent: Jun. 23, 2020

(54) BICYCLE HANDLEBAR ASSEMBLY WITH INTEGRATED OLEO-HYDRAULIC CONTROLS

(71) Applicant: Campagnolo S.r.l., Vicenza (IT)

(72) Inventor: Mario Meggiolan, Creazzo (IT)

(73) Assignee: CAMPAGNOLO S.R.L., Vicenza (IT)

( * ) Notice: Subject to any disclaimer, the term of this patent is extended or adjusted under 35 U.S.C. 154(b) by 0 days.

(21) Appl. No.: 14/297,045

(22) Filed: Jun. 5, 2014

(65) Prior Publication Data
US 2014/0360303 A1 Dec. 11, 2014

(30) Foreign Application Priority Data
Jun. 10, 2013 (IT) .............................. MI2013A0950

(51) Int. Cl.
| | | |
|---|---|---|
| B62L 3/02 | (2006.01) | |
| B62K 21/12 | (2006.01) | |
| B62K 23/06 | (2006.01) | |
| B62M 25/08 | (2006.01) | |
| B62K 23/02 | (2006.01) | |

(52) U.S. Cl.
CPC .............. *B62K 21/12* (2013.01); *B62K 23/02* (2013.01); *B62K 23/06* (2013.01); *B62L 3/023* (2013.01); *B62M 25/08* (2013.01); *Y10T 74/2028* (2015.01); *Y10T 74/20256* (2015.01)

(58) Field of Classification Search
CPC ........ B62K 21/12; B62K 23/02; B62K 23/06; B62K 11/14; B62L 3/023; B62M 25/08
USPC ................ 188/344, 345, 24.19, 24.21, 24.22
See application file for complete search history.

(56) References Cited

U.S. PATENT DOCUMENTS

| | | | | |
|---|---|---|---|---|
| 5,431,256 A | * | 7/1995 | Wen | B62L 1/14 188/196 M |
| 5,557,982 A | * | 9/1996 | Voss | B62K 21/12 280/279 |
| 5,690,192 A | * | 11/1997 | Kuo | B62L 1/10 188/24.22 |
| 6,484,855 B1 | | 11/2002 | Yaple | |
| 6,502,675 B1 | * | 1/2003 | Andrus | 188/344 |
| 7,240,772 B2 | * | 7/2007 | Tsai | 188/24.22 |
| 7,249,661 B2 | * | 7/2007 | Becocci et al. | 188/344 |
| 7,487,694 B2 | | 2/2009 | Fukui | |

(Continued)

FOREIGN PATENT DOCUMENTS

| | | |
|---|---|---|
| CN | 101337569 A | 1/2009 |
| CN | 101468705 A | 7/2009 |

(Continued)

OTHER PUBLICATIONS

Machine Translation in English for DE 20107599U1; Inventor: Fuchs; 2 pages; Retrieve Date: Jun. 5, 2015.*

(Continued)

*Primary Examiner* — Thomas J Williams
(74) *Attorney, Agent, or Firm* — Volpe and Koenig, P.C.

(57) ABSTRACT

The bicycle handlebar assembly comprises a handlebar rod and at least one oleo-hydraulic group for controlling on-board bicycle equipment; the oleo-hydraulic group is housed inside the handlebar rod. The internal housing in the handlebar rod overcomes any problems of bulk of the oleo-hydraulic group. Moreover, thanks to the relatively large size of the handlebar rod, the dimensional constraints imposed on the designer are much less stringent with respect to controls associated directly to the brake lever; it is thus relatively easy to make controls capable of exerting very large forces.

15 Claims, 6 Drawing Sheets

(56) References Cited

U.S. PATENT DOCUMENTS

| | | | |
|---|---|---|---|
| 2006/0169094 A1* | 8/2006 | Fukui | 74/551.8 |
| 2009/0008198 A1 | 1/2009 | Jinbo et al. | |
| 2009/0120751 A1* | 5/2009 | Lin et al. | 188/344 |
| 2009/0152061 A1* | 6/2009 | Tsai | 188/344 |
| 2009/0152063 A1* | 6/2009 | Tsai | B60T 11/16 188/344 |
| 2010/0051400 A1* | 3/2010 | Yang | B60T 7/102 188/344 |
| 2011/0031079 A1* | 2/2011 | Matsushita | B60T 7/102 188/344 |
| 2012/0241261 A1* | 9/2012 | Tsai | F16D 55/225 188/24.21 |
| 2012/0304803 A1 | 12/2012 | Meggiolan | |
| 2013/0333994 A1* | 12/2013 | Jordan et al. | 188/344 |
| 2014/0041379 A1 | 2/2014 | Ruckh et al. | |

FOREIGN PATENT DOCUMENTS

| | | |
|---|---|---|
| CN | 102806971 A | 12/2012 |
| DE | 20107599 U1 | 11/2001 |
| EP | 0875443 A2 | 11/1998 |
| GB | 301636 A | 12/1928 |
| JP | 10-316078 A | 12/1998 |
| JP | 2006-199138 A | 8/2006 |
| TW | I321109 | 6/2009 |
| TW | M412110 | 9/2011 |
| TW | 201242836 A | 11/2012 |
| TW | M446750 | 2/2013 |

OTHER PUBLICATIONS

Italian Search Report and Written Opinion in Italian Application No. IT MI2013A000950, dated Feb. 4, 2014 with English translation.
Taiwan Office Action for Application 103120052, dated Aug. 15, 2017.
Japanese Office Action dated May 22, 2018, received in Japanese Application No. 2014-118246.
Chinese Office Action for Application 201410254357.2 with English translation, dated Nov. 3, 2017.

* cited by examiner

BICYCLE HANDLEBAR ASSEMBLY WITH INTEGRATED OLEO-HYDRAULIC CONTROLS

CROSS REFERENCE TO RELATED APPLICATION(S)

This application claims the benefit of Italian Application No. MI2013A000950, which was filed on Jun. 10, 2013, and is incorporated herein by reference as if fully set forth.

FIELD OF INVENTION

The present invention relates to a bicycle handlebar assembly.

BACKGROUND

In modern bicycles, in particular in high-performance ones, it is becoming increasingly common to use on-board equipment that uses oleo-hydraulic controls. This is the case for example of disc braking systems, in which the force necessary to obtain adequate braking by the closing of the calipers on the discs is too high to be exerted with the usual cable systems, controlled by the cyclist's hands. With these braking systems, therefore, the force exerted by the cyclist's hand is transferred to an oleo-hydraulic group; more specifically, a piston is actuated that places oil inside a cylinder under pressure. The pressurised oil is then transferred through suitable tubes to the brake calipers, to obtain braking.

In addition to disc braking systems, other equipment could also advantageously use an oleo-hydraulic control.

It is known to associate the oleo-hydraulic groups to the bicycle by fixing them to a part thereof, like for example the frame or the handlebars; the brake lever actuates a cable that from the lever goes to the piston, which in turn places oil in the cylinder under pressure. In this way, however, oleo-hydraulic groups can be a hindrance to the cyclist while the bicycle is in use, due to their bulk, as well as making its aesthetic appearance less pleasing.

It is also known to associate the oleo-hydraulic controls directly to the brake lever; in these controls, the brake lever more or less directly actuates the piston that places oil in the cylinder under pressure, and this is located in the immediate vicinity of the brake lever. In these controls, the bulk can be less and less inconvenient to the cyclist with respect to controls with oleo-hydraulic groups applied to other parts of the bicycle.

The Applicant has realised, however, that oleo-hydraulic controls directly associated to the brake lever do not have problems of bulk only if the size of the cylinders is contained within fairly low limits; in practice, the designer is forced to use very small cylinders, which can reduce braking performance, or to accept a bulk that is still inconvenient.

The Applicant has thus thought to make an oleo-hydraulic control that does not have problems of bulk for the cyclist or size constraints for the designer.

SUMMARY OF THE INVENTION

Therefore, the present invention concerns a handlebar assembly as defined by claim 1; preferred characteristics are given in the dependent claims.

More specifically, the present invention concerns a bicycle handlebar assembly, comprising a handlebar rod and at least one oleo-hydraulic group for controlling on-board bicycle equipment, characterised in that the oleo-hydraulic group is housed inside the handlebar rod.

The housing inside the handlebar rod overcomes any problem of bulk of the oleo-hydraulic group. Moreover, thanks to the relatively large size of the handlebar rod, the size restrictions imposed on the designer are much less stringent with respect to controls directly associated to the brake lever; therefore, it is relatively easy to make controls capable of exerting very high forces.

Moreover, in this way the oleo-hydraulic group is protected from possible impacts as well as from atmospheric agents. Furthermore, the oleo-hydraulic group remains hidden from view and thus does not harm the appearance of the bicycle, and nor does it attract the attention of possible wrongdoers; an oleo-hydraulic group applied outside the handlebars or the frame or even associated to the brake lever, indeed, makes it possible to immediately recognise a high-value bicycle even from far away.

In an embodiment of the invention, the handlebar rod comprises an inner cavity, and the oleo-hydraulic group comprises a cylinder fixedly housed in the inner cavity of the handlebar rod. In this way, it is possible to easily use cylinders already found on the market and in this way it is possible to keep production costs low.

Preferably, the handlebar rod is moulded hollow and the cylinder is co-moulded in it. In this way, it is possible to ideally design the cylinder, substantially without size restrictions. Moreover, the cylinder itself becomes a structural part of the handlebars, i.e. capable of participating in the structural strength of the handlebars themselves; this can be a big advantage, since it allows the entire handlebars to be sized so as to reduce its weight as much as possible and in bicycles of this type, intended for the highest performance, the reduction of weight in each component is very important.

Preferably, the cylinder comprises an oil-filling passage at an opening in the handlebar rod. It is thus very quick and simple to fill and top up oil into the cylinder, even if the cylinder is fixed to the handlebars.

In a preferred embodiment, the on-board equipment is a hydraulic brake, actuated by pressurised fluid pushed by the oleo-hydraulic group. Preferably, the handlebar assembly comprises a brake control, with a brake lever and a brake cable, constrained at a first end thereof to the brake lever, a control lever, constrained to the brake cable at a second end thereof, and a pin, between the control lever and the handlebar rod; the oleo-hydraulic group comprises a piston sliding in the cylinder; and the piston is constrained to the control lever, so as to be actuated to compress fluid in the cylinder following actuation of the brake lever.

In this embodiment, therefore, the brake levers and the relative brake cables are totally similar to those of a normal bicycle with conventional mechanical pad brakes, with the sole difference that the brake cable only goes up to the handlebars and moves the control lever. It is thus possible to use the components of mechanical brakes, both for the brake levers, and for the attachment of the brake cables.

Preferably, the piston is hinged to the control lever in an intermediate position between the pin and the attachment position of the brake cable. The reciprocal positions on the control lever of the pin (fulcrum of the lever), of the brake cable (point of application of the driving force) and of the piston (point of application of the resistant force) are the typical ones of a so-called second class lever, in which the resistant force obtained is greater than the driving force applied, whereas, vice-versa, the movement of the point of application of the driving force is greater than the movement of the point of application of the resistant force. This configuration is thus particularly suitable for obtaining high pressures of the oil in the cylinder with small movements, since oil is much less compressible and therefore large displacements of the piston are not necessary.

Alternatively, the reciprocal positions on the control lever could be such as to configure a first class lever, with the pin in intermediate position between the brake cable and the piston. This solution, however, is not preferred, since in order to ensure the same mechanical advantage it requires greater bulk: the driving and resistant lever arms are one after the other and thus determine a larger bulk with respect to the second class lever configuration, where the maximum bulk is given by just the driving arm.

Preferably, the oleo-hydraulic cylinder is provided with two parallel ears, in which two holes are formed for the engagement of the pin. Thanks to this characteristic, the engagement between control lever and cylinder is direct, and therefore the forces transmitted from the brake cable to the piston do not pass through the material of the handlebar rod, which therefore does not need to be sized to withstand additional forces due to the presence of the cylinder.

Even more preferably, the handlebar rod comprises two holes at the holes in the ears of the cylinder, the pin being engaged both in the holes in the ears and in the holes in the handlebar rod. In this way, the pin contributes to the solidity of the coupling between cylinder and handlebar rod.

Preferably, the handlebar assembly comprises a control adjustment device between the control lever and the piston. It is thus possible to adjust the action on the piston and thus to adjust the pressure of the oil depending on the traction of the brake cable. More preferably, the control adjustment device comprises a threaded shank, mounted on the piston and in screwing engagement in a threaded seat formed in a cylinder rotatably mounted on the control lever. This simple device allows easy and precise adjustment.

Preferably, the handlebar assembly comprises a cable adjustment device between the brake cable and the control lever. It is thus possible to adjust the action on the control lever and thus adjust the pressure of the oil depending on the traction of the brake cable.

The cable adjustment device can for example comprise—in a per se known way—a pair of facing ring nuts, having angular sectors of different axial thickness, so that the axial thickness of the assembly of the pair of ring nuts varies based on the reciprocal angular position of the two ring nuts.

BRIEF DESCRIPTION OF THE DRAWING(S)

Further characteristics and advantages of the invention will become clearer from the following description of a preferred embodiment thereof, made with reference to the attached drawings. In such drawings.

DETAILED DESCRIPTION OF THE PREFERRED EMBODIMENT(S)

Figure 1:
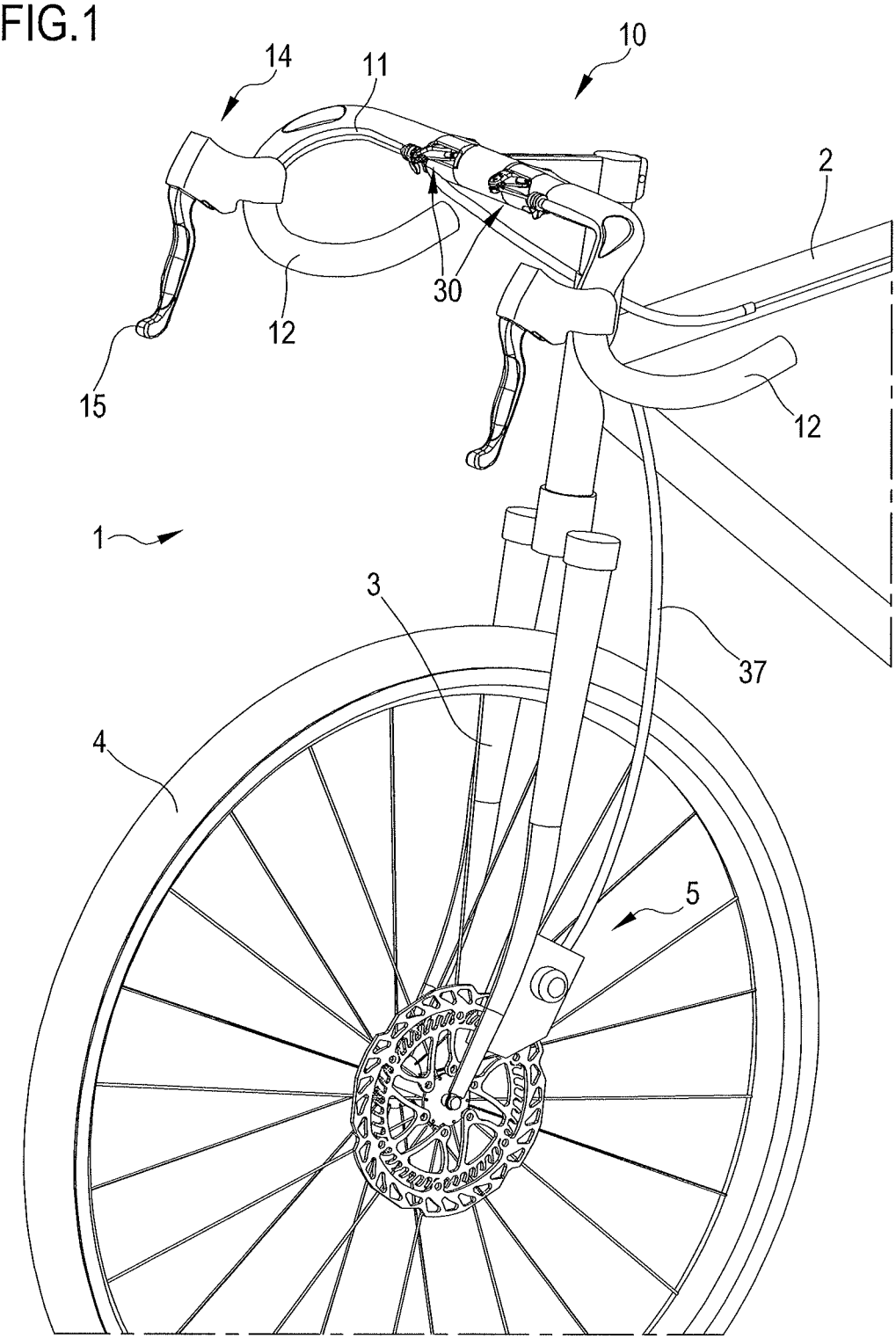
FIG. 1 is a perspective view of part of a bicycle, with a handlebar assembly according to the invention.
Figure 2:
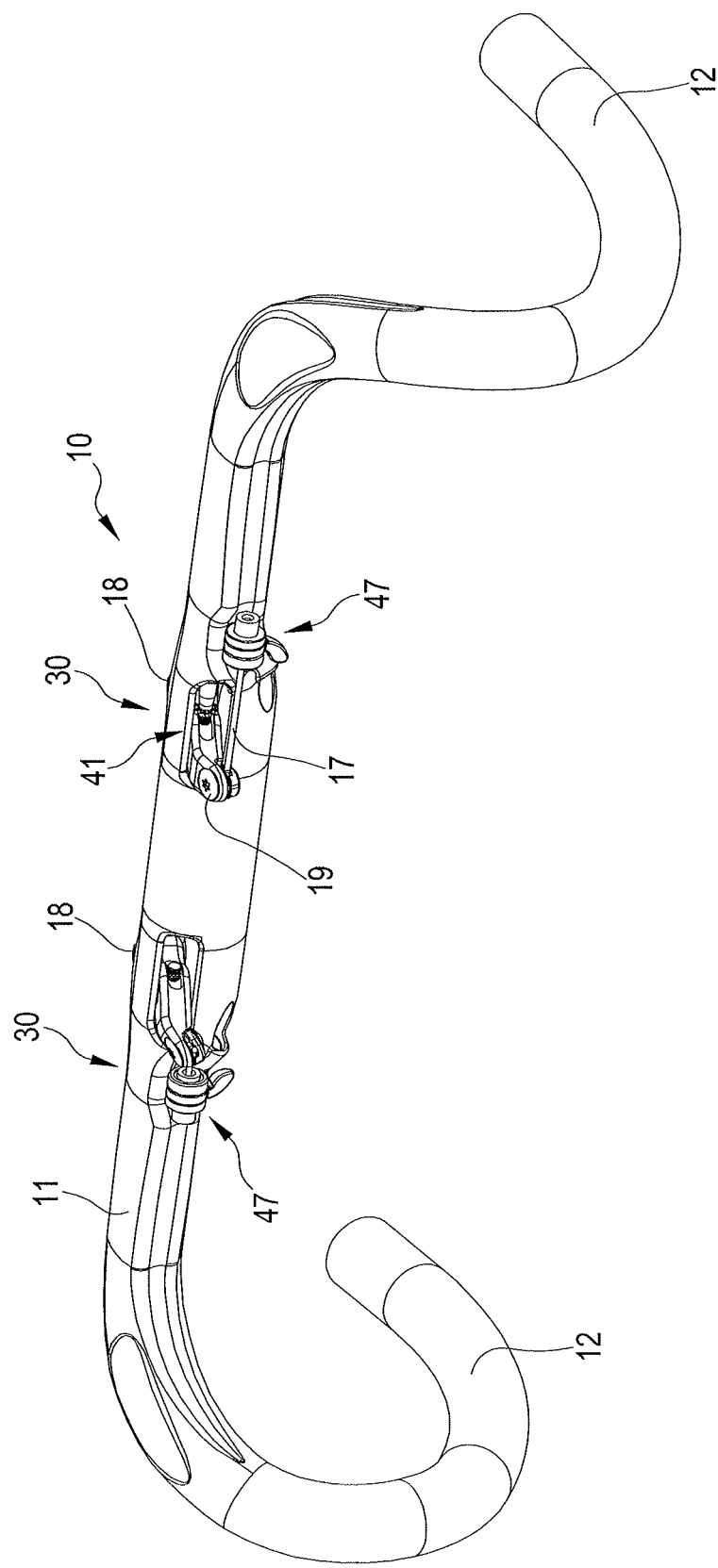
FIG. 2 is a perspective view of the handlebar assembly of the bicycle of FIG. 1.
Figure 3:
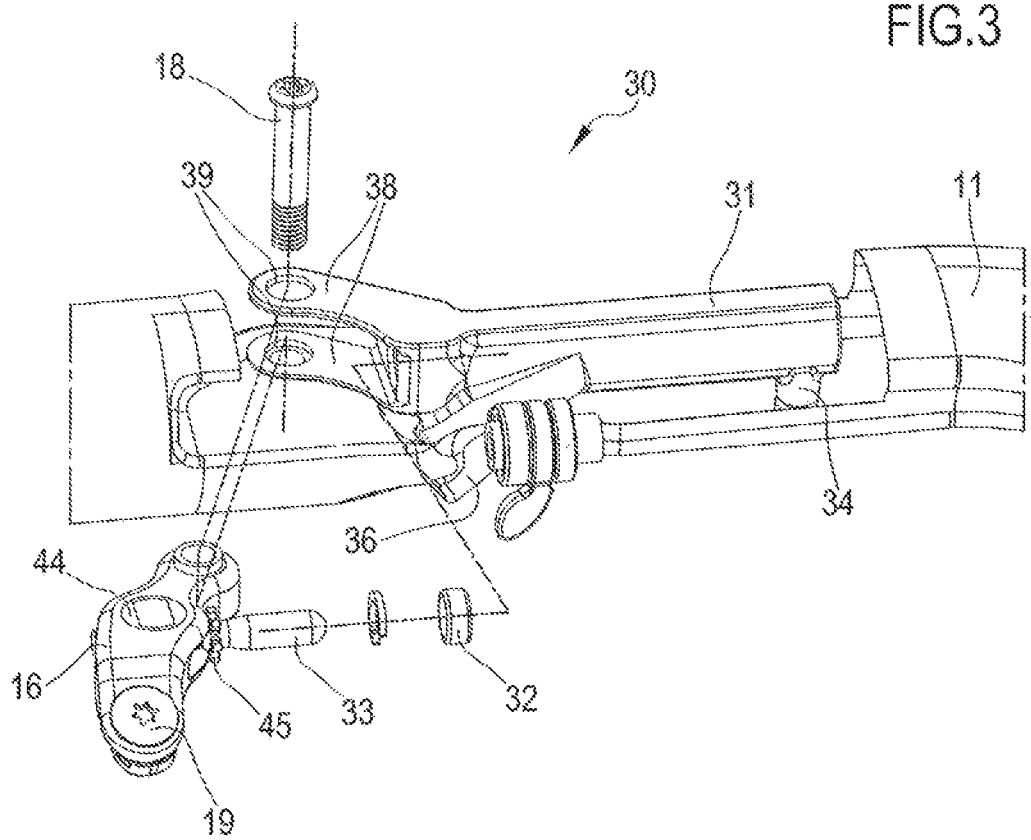
FIG. 3 is a view of a detail of the handlebar assembly of FIG. 2, with parts partially removed or separated.
Figure 4:
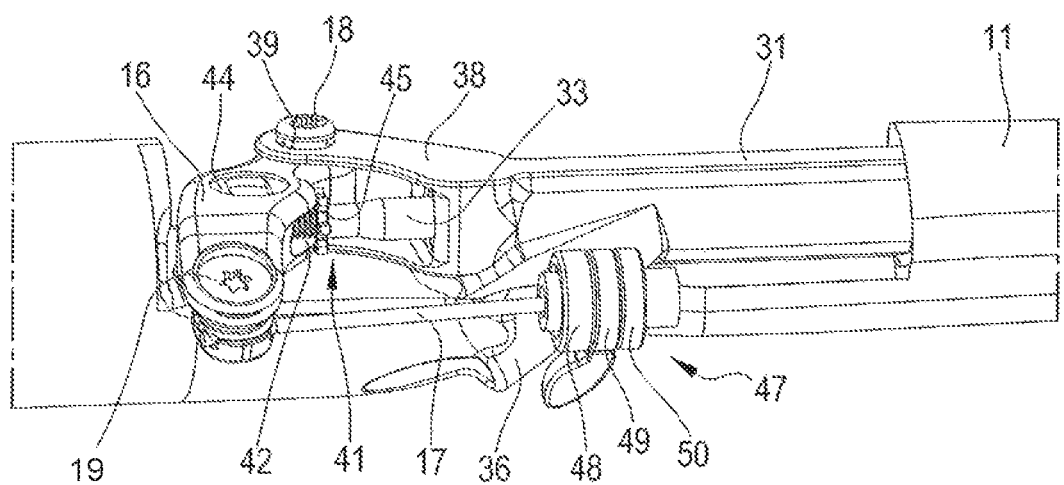
FIG. 4 is a view of the detail of FIG. 3, assembled and with parts partially removed.
Figure 5:
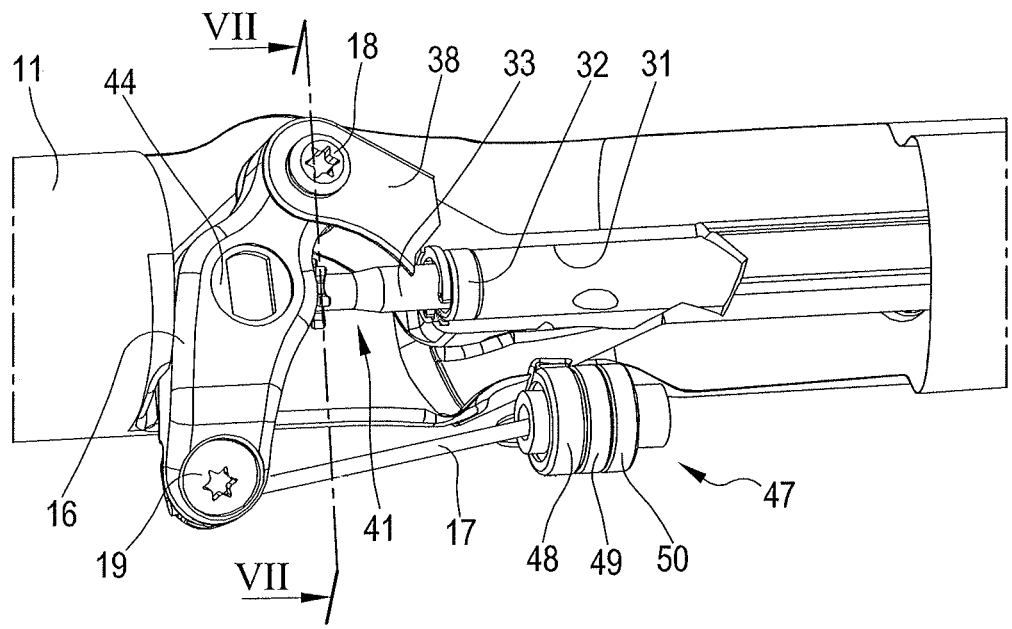
FIG. 5 is a view of the detail of FIG. 4, seen from a different angle.
Figure 6:
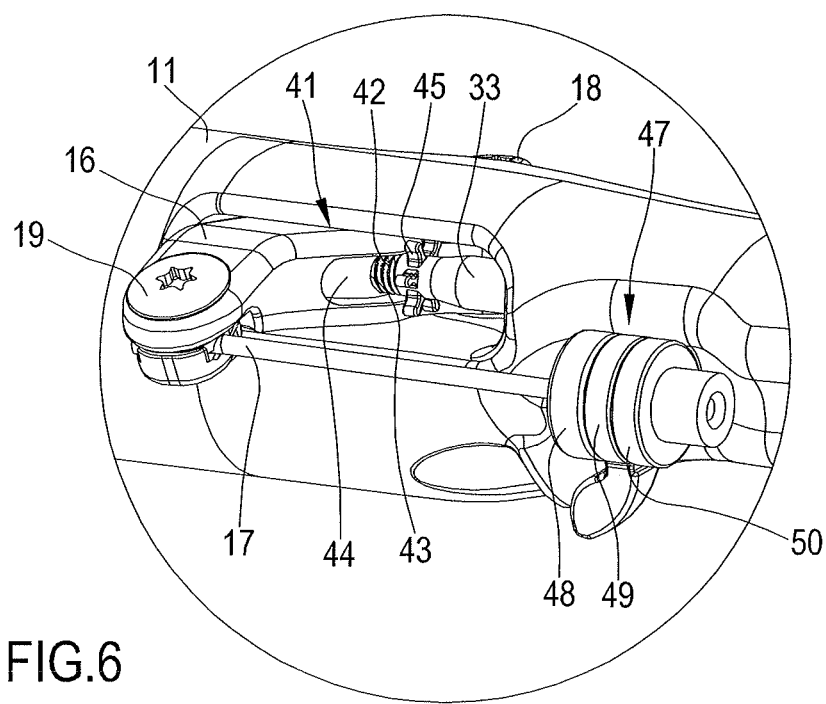
FIG. 6 is a view of the detail of FIG. 4, without parts removed.
Figure 7:
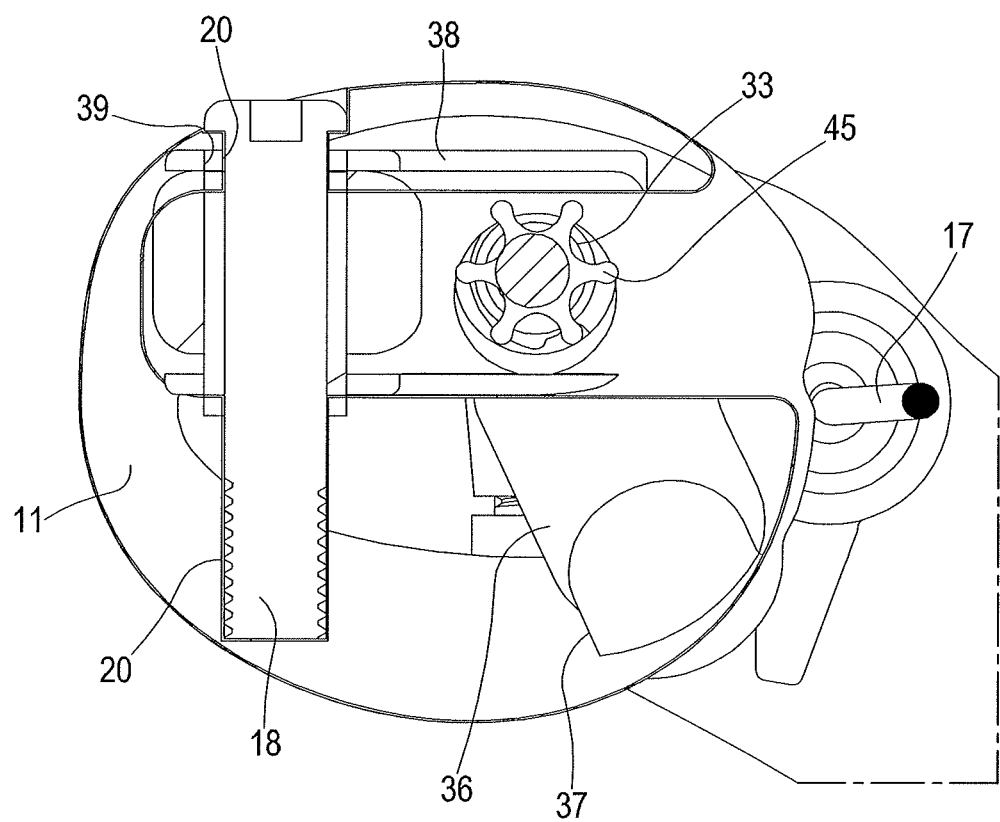
FIG. 7 is a section view of the handlebar assembly of FIG. 2, taken according to the line VII-VII of FIG. 5.
Figure 8:
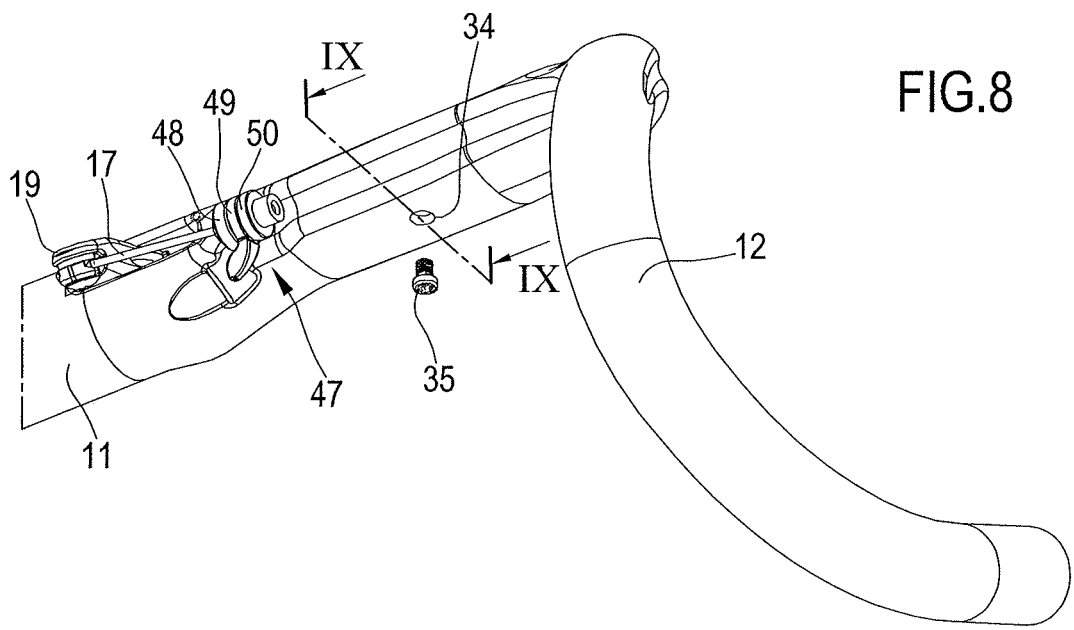
FIG. 8 is a view of a detail of the handlebar assembly of FIG. 2, with parts partially removed or separated.
Figure 9:
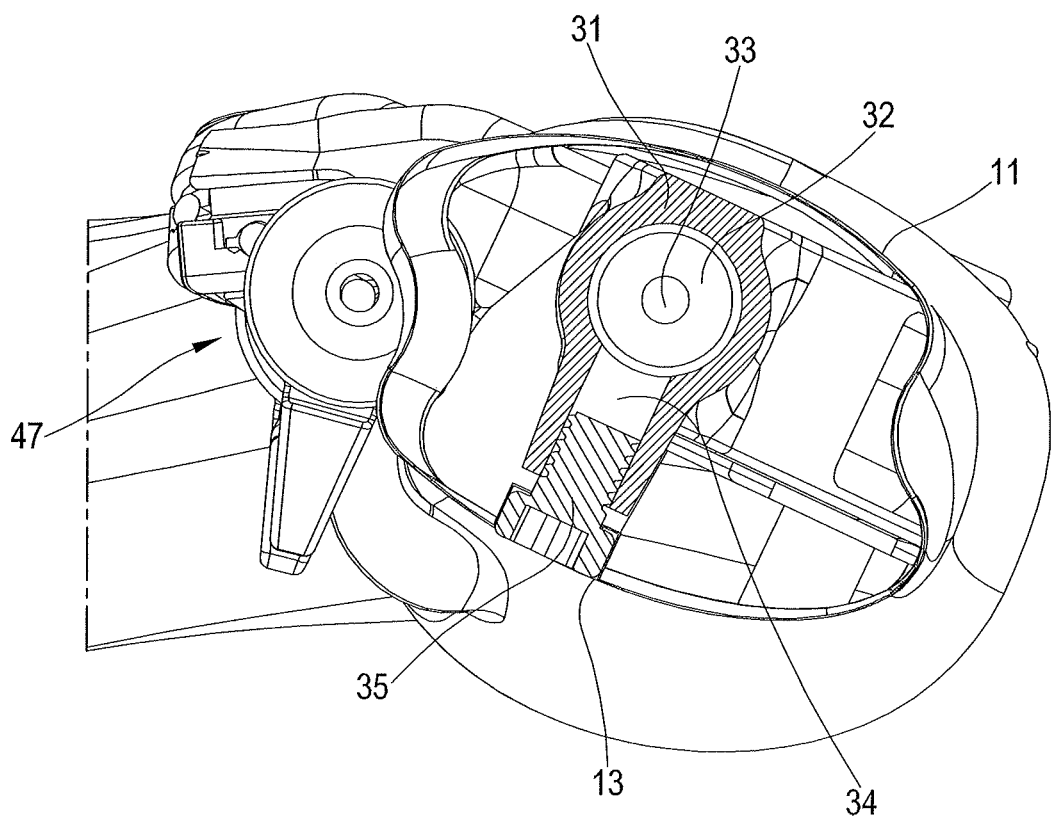
FIG. 9 is a section view of the detail of FIG. 8, taken according to the line IX-IX of FIG. 8.

In the figures, reference numeral 1 wholly indicates a high-performance bicycle, of which in FIG. 1 it is possible to see at least partially a frame 2, a fork 3 and a front wheel 4. The bicycle 1 is provided with disc brakes 5, the front brake of which can be seen in the figures.

The fork 3 has a handlebar assembly 10 mounted on it, in accordance with the invention. The handlebar assembly 10 comprises a handlebar rod 11 provided at its two ends with respective handgrips 12, for example of the curved type as shown in the figures.

The handlebar rod 11 is preferably made hollow from composite material, obtained by moulding from a matrix of polymeric material in which structural fibres (for example carbon fibres or similar) are included.

In the handlebar rod 11, in a central area thereof, two oleo-hydraulic groups are housed, both indicated with 30, each for controlling one of the two brakes of the bicycle 1. The oleo-hydraulic groups 30 are housed inside the handlebar rod 11.

Each oleo-hydraulic group 30 comprises a cylinder 31, fixedly housed in the handlebar rod 11, and preferably co-moulded in it, as well as a piston 32, sealably sliding in the cylinder 31 and mounted on a stem 33. The co-moulding of the cylinder 31 in the handlebar rod 11 promotes their stable attachment together, so that the cylinder 31 itself participates in the structural strength of the handlebar rod 11, to the extent that the latter can be sized thinner, indeed taking into account the strength contribution given by the cylinder 31.

The cylinder 31 comprises an oil-filling passage 34, provided at an opening 13 in the handlebar rod 11; the passage 34 is removably closed by a threaded cap 35, accessible and removable through the opening 13. In the cylinder 31 there is a fluid, in particular oil (not shown in the figures) intended to be placed under pressure as will be illustrated hereafter. The cylinder 31 is provided with an outlet mouth 36, to which a tube 37 is connected that takes pressurised fluid to one of the brakes 5, where the pressurised fluid is used to control a brake caliper on a brake disc, in a per se known way, not illustrated.

The handlebar assembly 10 at the handgrips 12 comprises respective brake controls 14, with a brake lever 15, a control lever 16 and a brake cable 17. The control lever 16 is hinged to the handlebar rod 11 through a pin 18, near to an end of the control lever 16 itself. The brake cable 17 is constrained at a first end thereof to the brake lever 15 (in a per se conventional way, not visible in the figures) and at a second end thereof to the control lever 16, through a cable clamp 19.

The stem 33 of the piston 32 is constrained to the control lever 16, so as to be actuated to compress the fluid in the cylinder 31 following actuation of the brake lever 15. The piston 32 is hinged to the control lever 16 in an intermediate position between the pin 18 and the attachment position of the brake cable 17.

The cylinder 31 is provided with two substantially parallel ears 38, in which two respective holes 39 are formed for the engagement of the pin 18. At the holes 39, the handlebar rod 11 comprises two holes 20. The pin 18 is in engagement both in the holes 39 in the ears 38, and in the holes 20 in the handlebar rod 11, so that on the one hand the mechanical action of the control lever 16 with respect to the cylinder 31 is direct and safe, thanks to the hinging of the lever 16 directly to the cylinder 31, and on the other hand the pin 18 contributes to anchoring the cylinder 31 to the handlebar rod 11.

The handlebar assembly 10 also comprises a control adjustment device 41 between the control lever 16 and the piston 32. The control adjustment device 41 comprises a threaded shank 42, mounted on the pin 33 of the piston 32 and in screwing engagement in a threaded seat 43 formed in a cylinder 44, which is rotatably mounted on the control lever 16. A ring nut 45 is fixedly mounted on the stem 33 near to the shank 42, to facilitate its actuation in rotation.

Each brake control 14 also comprises a cable adjustment device 47 between the brake cable 17 and the control lever 16. For example, the device 47 comprises—in a per se known way, not illustrated in detail—a pair of facing ring nuts 48 and 49, having angular sectors of different axial thickness, so that the axial thickness of the assembly of the pair of ring nuts 48 and 49 varies based on the reciprocal angular position of the two ring nuts themselves; a washer 50 is provided on which to rest the end 51 of the sheath 52 of the brake cable 17.

The operation of the handlebar assembly 10 can be clearly seen from the above description. In case of braking, the cyclist actuates the brake lever 15 in the normal fashion and in this way induces a traction on the brake cable 17, with respect to the sheath 52. The brake cable 17 then moves the control lever 16 angularly around the pin 18 that thus pushes the piston 32 in the cylinder 31. The result is that the fluid in the cylinder 31 is put under pressure and the pressure in transferred from the tube 37 to the brake caliper 5, obtaining braking.

It is clear that the force with which the brake caliper 5 is brought together depends on the pressure of the fluid, which in turn depends not only on the force exerted by the cyclist on the brake lever 15, but also and particularly on the relationships between the lever arms on the control lever 16 and on the section of the piston 32 and of the cylinder 31. In particular, thanks to the housing of the cylinder 31 in the handlebar rod 11, the section of the cylinder 31 can be relatively large, so as to ensure proportionally high pressures of the fluid, without this resulting in inconvenient bulks.

What is claimed is:

1. Bicycle handlebar assembly, comprising:
   a handlebar rod that defines an outer surface and an inner cavity defining an inner surface;
   a hydraulic brake actuated by pressurised fluid;
   a brake control with a brake lever, a brake cable constrained at a first end thereof to the brake lever, a control lever constrained to the brake cable at a second end thereof, and a pin between the control lever and the handlebar rod;
   at least one hydraulic assembly that controls the hydraulic brake and includes a fluid containing cylinder that is structurally unitized with the inner surface, and a piston slidable in the fluid containing cylinder,
   wherein the piston is constrained to the control lever, so as to be actuated to compress fluid in the fluid containing cylinder following actuation of the brake lever, thereby providing the pressurised fluid to the hydraulic brake;
   wherein the fluid containing cylinder is provided with two parallel ears in which two holes are formed; and
   the handlebar rod comprises two holes at positions corresponding to the holes in the ears of the fluid containing cylinder, the pin being in engagement in both (i) the holes in the ears and (ii) the holes in the handlebar rod, and
   the pin provides both: (i) anchoring between the fluid containing cylinder and the handlebar rod, and (ii) hinging of the control lever to both the handlebar rod and the fluid containing cylinder.

2. Assembly according to claim 1, wherein the fluid containing cylinder comprises a hydraulic fluid passage at an opening in the handlebar rod.

3. Assembly according to claim 1, wherein the piston is hinged to the control lever in an intermediate position between the pin and the attachment position of the brake cable.

4. Assembly according to claim 3, comprising a control adjustment device between the control lever and the piston.

5. Assembly according to claim 4, wherein the control adjustment device comprises a threaded shank, mounted on the piston and in screwing engagement in a threaded seat formed in a cylinder rotatably mounted on the control lever.

6. Assembly according to claim 1, comprising a cable adjustment device between the brake cable and the control lever.

7. A method of making a bicycle handlebar assembly, the method comprising:
   providing a handlebar rod that defines an inner cavity;
   providing a brake control including a control lever;
   providing a hydraulic assembly that controls on-board bicycle equipment and includes a fluid containing cylinder;
   providing a pin between the control lever and the handlebar rod; and
   co-moulding the fluid containing cylinder and the handlebar rod to form a unitized structure where the pin is both (i) anchoring the fluid containing cylinder with the handlebar rod, and (ii) hinging the control lever to both the handlebar rod and the fluid containing cylinder.

8. The method according to claim 7, wherein the fluid containing cylinder includes a hydraulic fluid passage at an opening in the handlebar rod.

9. The method according to claim 7,
   wherein the on-board equipment is a hydraulic brake, actuated by pressurised fluid pushed by the hydraulic assembly;
   wherein the brake control includes a brake lever and a brake cable, constrained at a first end thereof to the brake lever, and the control lever is constrained to the brake cable at a second end thereof;
   wherein the hydraulic assembly comprises a piston able to slide in the fluid containing cylinder;
   and the piston is constrained to the control lever, so as to be actuated to compress fluid in the fluid containing cylinder following actuation of the brake lever.

10. The method according to claim 9, wherein the piston is hinged to the control lever in an intermediate position between the pin and the attachment position of the brake cable.

11. The method according to claim 10, wherein a control adjustment device is arranged between the control lever and the piston.

12. The method according to claim 11, wherein the control adjustment device comprises a threaded shank, mounted on the piston and in screwing engagement in a threaded seat formed in a cylinder rotatably mounted on the control lever.

13. The method according to claim 9, wherein the fluid containing cylinder is provided with two parallel ears, in which two holes are formed for the engagement of the pin.

14. The method according to claim 13, wherein the handlebar rod comprises two holes at the holes in the ears of the fluid containing cylinder, the pin is in engagement both in the holes in the ears and in the holes in the handlebar rod.

15. The method according to claim 9, comprising a cable adjustment device between the brake cable and the control lever.

\* \* \* \* \*